US008823545B2

(12) United States Patent
Majava

(10) Patent No.: US 8,823,545 B2
(45) Date of Patent: Sep. 2, 2014

(54) RADIO APPARATUS FOR GYM DEVICE

(71) Applicant: Polar Electro Oy, Kempele (FI)

(72) Inventor: Ville Majava, Kiviniemi (FI)

(73) Assignee: Polar Electro Oy, Kempele (FI)

( * ) Notice: Subject to any disclaimer, the term of this patent is extended or adjusted under 35 U.S.C. 154(b) by 0 days.

(21) Appl. No.: 14/162,437

(22) Filed: Jan. 23, 2014

(65) Prior Publication Data

US 2014/0210635 A1 Jul. 31, 2014

(30) Foreign Application Priority Data

Jan. 25, 2013 (GB) .................................. 1301326.3

(51) Int. Cl.
G08C 19/16 (2006.01)
G08C 15/08 (2006.01)
G08B 13/14 (2006.01)
G08B 23/00 (2006.01)
H01Q 3/34 (2006.01)
H04Q 9/00 (2006.01)

(52) U.S. Cl.
CPC ... H01Q 3/34 (2013.01); H04Q 9/00 (2013.01)
USPC .............. 340/870.01; 340/870.14; 340/572.1; 340/573.1; 340/572.7

(58) Field of Classification Search
CPC ........... H04Q 2209/47; H04Q 2209/86; G08C 17/02; G06K 19/01717; G06K 19/0712; G06K 7/10237; G06K 7/10316; G08B 21/0446; G08B 21/0453; A61B 2019/448; A61B 5/0002; A61B 5/002; A61B 5/0022; A61B 5/02438; A61B 5/042

USPC .............. 340/870.011, 870.14, 572.1, 573.1, 340/572.7
See application file for complete search history.

(56) References Cited

U.S. PATENT DOCUMENTS

| | | | |
|---|---|---|---|
| 6,204,813 B1 | 3/2001 | Wadell et al. | |
| 6,270,433 B1 | 8/2001 | Orenstein et al. | |
| 6,526,310 B1 * | 2/2003 | Carter et al. | ................. 600/509 |
| 6,590,536 B1 | 7/2003 | Walton | |

(Continued)

FOREIGN PATENT DOCUMENTS

| | | |
|---|---|---|
| DE | 102007046366 A1 | 4/2008 |
| EP | 1 739 856 A1 | 1/2007 |
| WO | 03/056356 A1 | 7/2003 |
| WO | 2011/035256 A2 | 3/2011 |
| WO | 2012/176217 A1 | 12/2012 |

OTHER PUBLICATIONS

United Kingdom Office Action, Application No. GB1301326.3, dated Jan. 31, 2014, 1 page.

(Continued)

Primary Examiner — Daniel Wu
Assistant Examiner — Emily C Terrell
(74) Attorney, Agent, or Firm — Hoffmann & Baron, LLP

(57) ABSTRACT

There is provided a radio apparatus for a gym device, the apparatus comprising: an antenna array comprising at least two antenna elements for wirelessly communicating with exercise sensors; at least one processor and at least one memory including a computer program code, wherein the at least one memory and the computer program code are configured, with the at least one processor, to cause the radio apparatus at least to: generate at least one antenna beam pattern with at least one of the at least two antenna elements; and communicate wirelessly with an exercise sensor by applying the generated at least one antenna beam pattern.

16 Claims, 8 Drawing Sheets

(56) References Cited

U.S. PATENT DOCUMENTS

| | | |
|---|---|---|
| 7,278,966 B2 * | 10/2007 | Hjelt et al. .................... 600/300 |
| 8,001,472 B2 * | 8/2011 | Gilley et al. .................. 715/716 |
| 2006/0034279 A1 | 2/2006 | Cho et al. |
| 2007/0178862 A1 | 8/2007 | Winters et al. |
| 2009/0018773 A1 | 1/2009 | Niva et al. |
| 2010/0062818 A1 | 3/2010 | Haughay, Jr. et al. |
| 2010/0203829 A1 | 8/2010 | Granqvist et al. |
| 2011/0080264 A1 | 4/2011 | Clare et al. |

OTHER PUBLICATIONS

United Kingdom Office Action, Application No. GB1301326.3, dated Sep. 18, 2013, 3 pages.

United Kingdom Office Action and Search Report, Application No. GB1301326.3, dated Mar. 22, 2013, 7 pages.

* cited by examiner

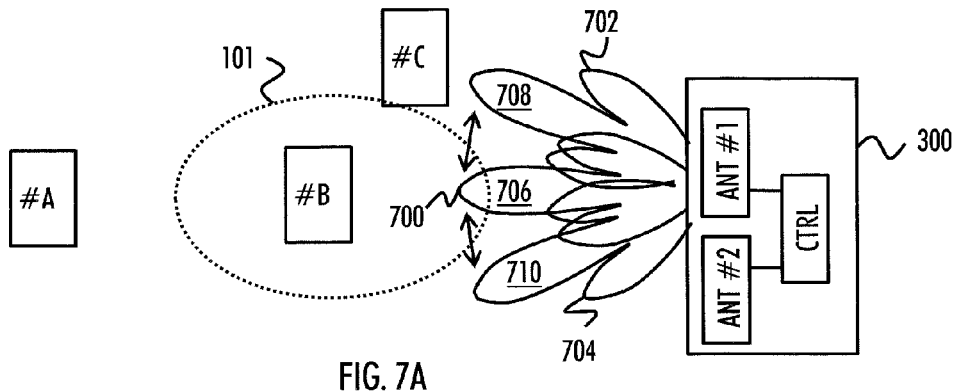
FIG. 7A
| BEAM # | SENSOR ID | RSSI |
|---|---|---|
| 2 | A | 1 |
| 1 | A | 2 |
| 3 | A | 1 |
| 2 | B | 5 |
| 1 | B | 6 |
| 3 | B | 1 |
| 2 | C | 8 |
| 1 | C | 7 |
| 3 | C | 1 |
FIG. 7B
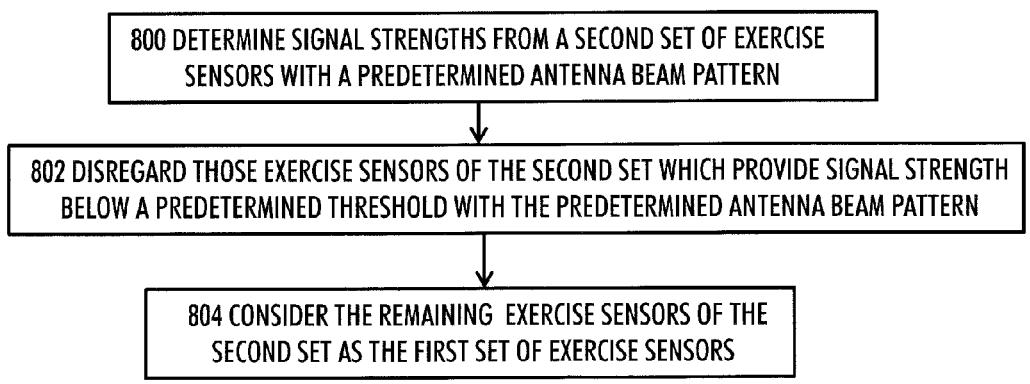
FIG. 8

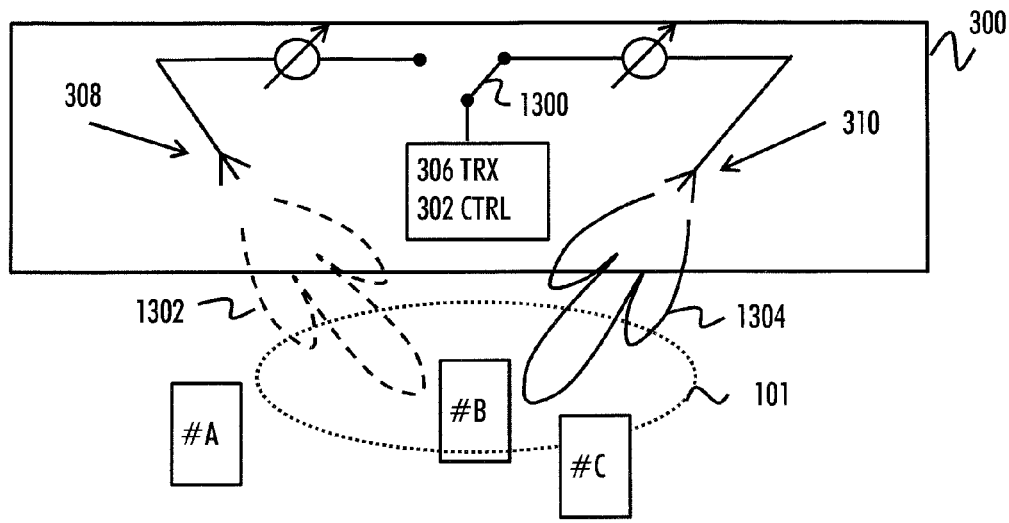

FIG. 13A

```
1310 GENERATE A FIRST ANTENNA BEAM PATTERN WITH AT LEAST A FIRST ANTENNA
ELEMENT, WHEREIN THE MAIN LOBE IS DIRECTED TO AN EXERCISE AREA OF THE GYM DEVICE
                                    ↓
1312 DETERMINE SIGNAL STRENGTHS FROM A PLURALITY
OF EXERCISE SENSORS WITH THE FIRST ANTENNA BEAM PATTERN
                                    ↓
1314 GENERATE A SECOND ANTENNA BEAM PATTERN WITH AT LEAST A SECOND ANTENNA
ELEMENT, WHEREIN THE MAIN LOBE IS DIRECTED TO THE EXERCISE AREA OF THE GYM DEVICE
                                    ↓
1316 DETERMINE SIGNAL STRENGTHS FROM THE PLURALITY
OF EXERCISE SENSORS WITH THE SECOND ANTENNA BEAM PATTERN
                                    ↓
1318 SELECT ONE OF THE PLURALITY OF EXERCISE SENSORS ON THE
BASIS OF THE DETERMINED SIGNAL STRENGTHS
                                    ↓
1320 PERFORM PAIRING OF THE RADIO APPARATUS WITH THE SELECTED EXERCISE SENSOR.
```

FIG. 13B

RADIO APPARATUS FOR GYM DEVICE

CROSS-REFERENCE TO RELATED APPLICATION

This application claims priority to United Kingdom Application No. 1301326.3, filed Jan. 25, 2013, which is incorporated by reference herein in its entirety.

BACKGROUND

1. Field

The invention relates generally to gym devices and a radio apparatus for such gym device in order to detect a presence of an exercise sensor in the proximity of the gym device.

2. Description of the Related Art

Modern electronic gym devices, such as treadmills, exercise bicycles, and cross trainers, may wirelessly be coupled to exercise sensors worn by the user of the gym device. The exercise sensor may measure biosignals, such as heart activity signals, and/or motion signals from the user. The exercise sensor generates a wireless transmission from the biosignal, and the wireless transmission is transmitted to the gym device. The gym device typically comprises a user interface, such as a display, for displaying exercise data generated from the wireless transmission. It is also possible, that data carried by the wireless transmission is further directed to a user account of the user for real-time or later analysis by the gym device. It is very important, that the exercise sensor of a specific user is wirelessly coupled to a specific gym device in so that correct exercise data is displayed to the user and that correct exercise data is directed to the specific user account.

A typical gym environment involves a plenty of wireless transmissions by sensors of the users. Therefore, there is a high risk that a wireless coupling between an exercise sensor and a gym device fails, and a wrong user's exercise data is received by the gym device. Therefore, it is important to consider techniques to minimize the above risk.

SUMMARY

According to an aspect of the invention, there are provided apparatuses as specified in claims 1 and 17.

According to an aspect of the invention, there is provided a method as specified in claim 18.

According to an aspect of the invention, there is provided a computer program product embodied on a distribution medium readable by a computer and comprising program instructions which, when loaded into an apparatus, execute any of the embodiments as described in the appended claims.

According to an aspect of the invention, there is provided an apparatus comprising means for performing any of the embodiments as described in the appended claims.

Embodiments of the invention are defined in the dependent claims.

BRIEF DESCRIPTION OF THE DRAWINGS

In the following, the invention will be described in greater detail with reference to the embodiments and the accompanying drawings, in which

FIGS. 7A and 7B illustrate beamforming and signal strength measuring, according to some embodiments;

FIGS. 8, 9A, and 9B show methods according to some embodiments;

FIGS. 13A and 13B illustrate an embodiment for selecting an exercise sensor to pair with.

DETAILED DESCRIPTION

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Figure 1A:
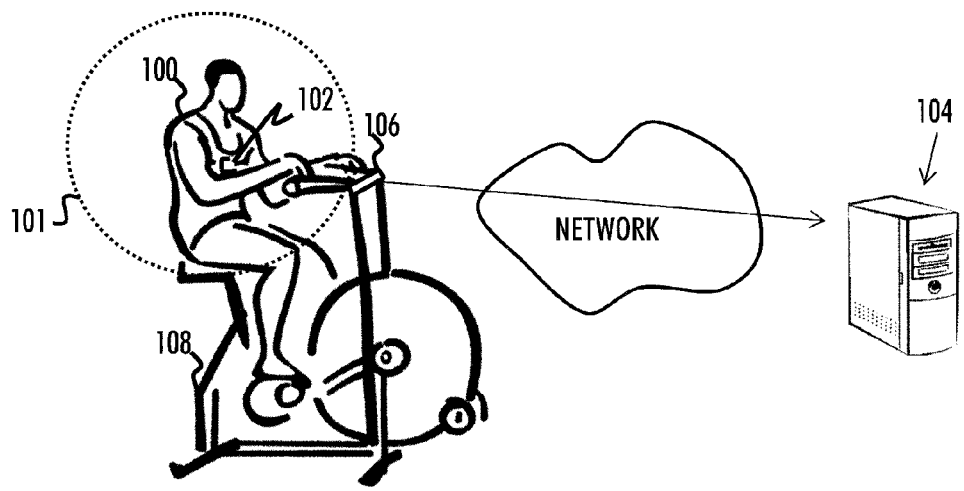
FIGS. 1A and 1B present a gym device, according to an embodiment.

FIG. 1A illustrates a performance monitoring arrangement according to an embodiment of the invention. Referring to FIG. 1A, a user 100 (an exerciser) carries out a physical exercise in a gym, fitness center, or in a similar training environment by using a gym device or equipment 108, e.g. a treadmill, an exercise cycle, or a rowing machine. An exercise sensor 102 is attached to the body of the user 100 in order to measure exercise data during the exercise.

In an embodiment, the exercise sensor 102 is a heart activity sensor comprising at least one electrical or optical sensor to measure heart activity of the user 100. The exercise sensor 102 may transmit measured heart activity data wirelessly to an interface unit 106 of the gym device 108. The sensor 102 may transmit the heart activity measurement data constantly as it is measured. The actual transmissions may be intermittent, depending on the wireless communication protocol being used. The heart activity measurement data may be primitive measurement data, such as ECG (Electrocardiogram) data, instantaneous heart rate values, average heart rate values averaged over a determined number of heart beats, RR intervals acquired from peak intervals of heart rate signals.

In an embodiment, a wireless transmission utilizes one of the following short range device-to-device communication technologies: Bluetooth, Bluetooth Low Energy, wireless local area network (WLAN), ANT or ANT+ by Dynastream, or IEEE 802.15.4. Other short-range device-to-device or network communication protocols are equally possible. The short range device-to-device connection may also be called a proximity connection because of its short communication range. The communication range may be in the order of a couple of meters, e.g. less than five meters.

Figure 1B:
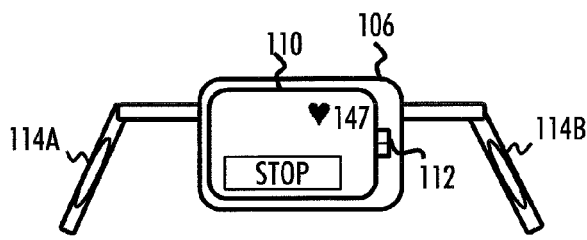

The interface unit 106 shown in FIG. 1B may comprise a user interface 110 to display e.g. the received hear activity measurement data to the user 100. The interface unit 106 may comprise input buttons 112 enabling the user to configure the gym device 108 and control the execution of the physical exercise. The user interface 110 may also comprise a touch-sensitive display, for example. When the user 100 approaches the training device 108, the connection between the exercise sensor 102 and the interface unit 106 may be established automatically. Then the measured exercise data may be transmitted wirelessly to the corresponding interface unit 106. It is also possible that the interface unit 106 acts as a gateway and directs the exercise data to a remote computer 104 such as a local or a web server via a network, as will be described later.

As known, the gym environment may include a variety of different gym devices. It should be noted that one training session at the gym may comprise several sub-sessions, each comprising a specific, possibly different gym device 108. It may be advantageous that when the user exercises with a gym device X, the exercise sensor 102 is paired with the gym device X. As the user moves to a gym device Y, the pairing with the gym device X is released and pairing with the gym device Y is performed. The pairing should be as user-friendly as possible. The most user-friendly pairing may be based on sensing the proximity of the exercise sensor 102 to the gym device interface unit 106.

However, modern fitness centers are harsh radio environments due to numerous radio devices operating at radio frequencies. Such radio devices may be BlueTooth devices, Bluetooth Smart devices, wireless network access points (WLAN), proprietary radio devices of personal training computers (ANT, ANT+, WIND), and devices applying near filed communication of radio frequency identification (RFID). Typically such radio devices are mobile phones, personal computers, exercise sensors (physiological sensors, foot pods, etc.), gym devices and wireless network access devices. Furthermore, due to indoors environment, the radio path diversity is increased, and numerous radio paths make the radio environment even more complex. As a result, the difficult radio environment in the gym may cause uncertainty in correct detection of the proximity of the exercise sensor 102. Further, the radio communication efficiency in the gym may not be optimal.

Figure 3A:
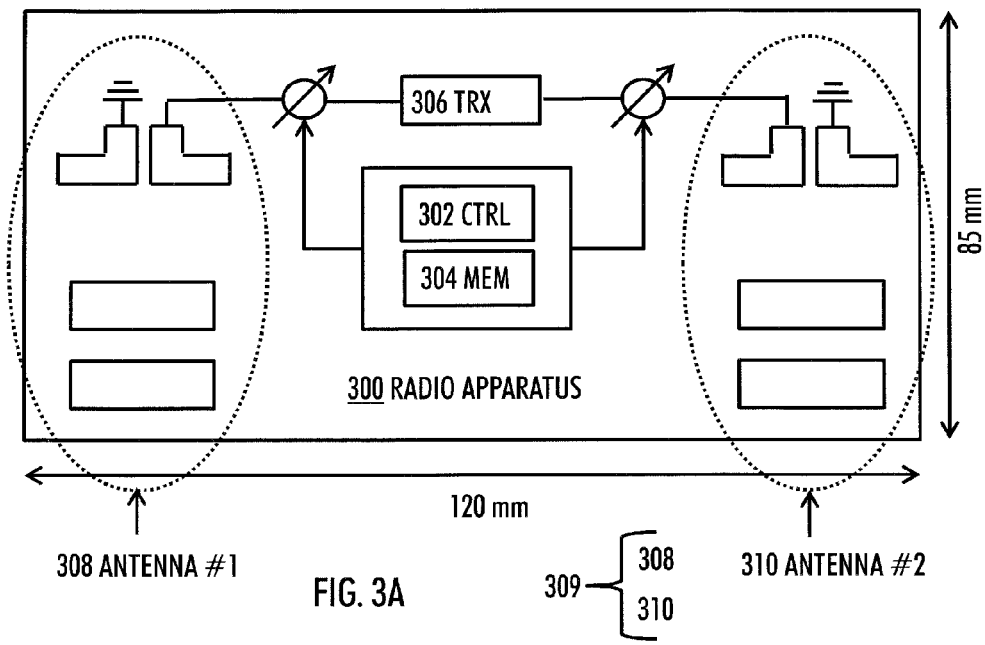
FIGS. 3A, 3B and 4 show a radio apparatus according to some embodiments.

Therefore, there is proposed, as shown in FIG. 3A, a radio apparatus 300 for a gym device, such as for the gym device 108, wherein the apparatus includes an antenna array 309 comprising at least two antenna elements 308, 310. The antenna elements 308, 310 may be separated from each other by the order of a wavelength, at least. The radio apparatus 300 may be formed on a printed circuit board (PCB), for example. In an embodiment, the antennas 308, 310 form a planar antenna structure on the PCB.

In an embodiment of the invention, the antenna array is a phased antenna array, wherein the antennas 308, 310 are phased.

In an embodiment, the antennas form a yagi-type antenna with at least two antenna elements. In an embodiment, the antennas 308, 310 may be phased in order to enable sweeping of the antenna beam(s), for example, as will be described. In this case, there may be, for example, surface mounted components in the radio apparatus 300.

The radio apparatus 300 may further comprise at least one processor (CTRL) 302 and at least one memory (MEM) 304 including a computer program code for controlling the operation of the radio apparatus 300. Further, the radio apparatus 300 may comprise a communication interface (TRX) 306 providing the radio apparatus 306 with communication capabilities to transmit and/or receive data wirelessly via the at least two antennas 308 and 310. In an embodiment, the transceiver 306 is a Bluetooth or a Bluetooth Smart transceiver.

Figure 2:
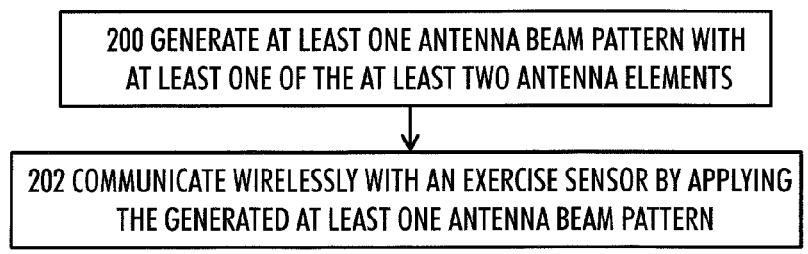
FIG. 2 shows a method, according to an embodiment.

The at least one memory 304 and the computer program code may be configured, with the at least one processor 302, to cause the radio apparatus 300 to generate, in step 200 of FIG. 2, at least one antenna beam pattern with at least one of the at least two antenna elements 308, 310. Each antenna beam pattern may comprise a main lobe/beam directed to the desired direction and side lobes directed outside the desired direction. However, typically the gain of the side lobes may be small compared to the gain of the desired, main lobe. Throughout the application, the term main lobe is used to denote the desired antenna beam as opposed to the side lobes or a back lobe typically present in any generated antenna beam pattern.

The generated antenna beam pattern corresponds to the applied antenna configuration. The antenna configuration comprises all the elements of the antenna structure affecting the antenna beam pattern, such as the types of antennas, phases/delays caused to the antenna feed signals, types of feed signals, number of antenna elements, antenna losses, distances between the antenna elements, and other possibly required components such as switches, resistors, capacitors, etc. With a certain type of antenna configuration, a desired type of antenna beam pattern may be generated. The required type of antenna configuration may be derived empirically or via mathematical modeling, for example.

As said, the radio apparatus 300 may generate at least one antenna beam pattern with at least one of the at least two antenna elements 308, 310. This includes, for example, the radio apparatus 300 generating one antenna beam pattern by applying at least two antenna elements 308, 310 or generating two antenna beam patterns, each with at least one antenna element 308 and/or 310.

In an embodiment, the two antenna elements 308, 310 may allow the radio apparatus 300 to adjust the generated antenna beam pattern(s). That is, to enable forming a desired antenna beam pattern, a.k.a. to enable beamforming, for a transmission and/or a reception of signals wirelessly. E.g. adjust the direction of the main lobe of the antenna beam pattern. The proposed radio apparatus 300 may thus improve the spatial resolution from one-antenna case. Further, together with RF transmitting power level adjustment, it may also give a good depth-resolution. In an embodiment, the communication takes place by applying a Bluetooth radio access.

In step 202, the radio apparatus 300 may communicate wirelessly with an exercise sensor 102 by applying the generated at least one antenna beam pattern. The communication may concern wireless transmission and/or reception of data to or from the exercise sensor 102. For example, the data may comprise signals related to pairing of the radio apparatus 300 with the exercise sensor 102, exercise-related data, identification of the exercise sensor 102, beacon signals, data related to the user of the exercise sensor 102.

In an embodiment, the exercise sensor 102 may comprise a physiological sensor, such as a heart activity sensor for determining the heart activity of the user by means of electric and/or optical detectors, a sensor for determining the skin temperature of the person or a blood pressure sensor. In an embodiment, the exercise sensor 102 comprises an exercise performance sensor, such as a stride sensor for measuring the speed and/or pace of the user while running in the treadmill, for example.

In an embodiment, as shown in FIG. 3A, the dimensions of the apparatus are approximately 120 millimeters in one side and 85 millimeters in other side.

Figure 3B:
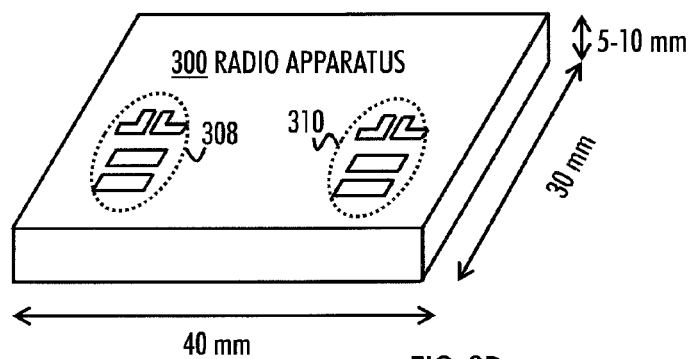

In an embodiment of FIG. 3B, the radio apparatus 300 comprises a dielectric substrate structure arranged to reduce the effective wavelength of radio frequency signals in the antenna array 309. The dielectric substrate structure may have a relatively high dielectric constant $\in$, such as between 10 and 80. Example materials for the dielectric substrate include, e.g., ceramic or alumina. In an embodiment, at least the radiating portion of the antenna elements 308 and 310 are embedded in the dielectric material. In another embodiment, some other elements of the radio apparatus 300, such as the feed lines for the antennas are also embedded in the dielectric material.

As said, owing to the use of the dielectric substrate structure in the printed circuit board comprising the antennas 308, 310, the physical size of the antenna structure may be decreased. This may be because the electrical length of the antenna structure, expressed in wavelengths, is increased. Therefore, the physical size may be decreased in proportion to the dielectric constant of the dielectric substrate material. In this embodiment where the dielectric substrate is used, the dimensions may be, at maximum, 50 millimeters times 30 millimeters, as shown in FIG. 3B. Even smaller dimensions, such as approximately 40 times 30 millimeters may be achieved in an embodiment by applying a thicker PCB having the dielectric substrate. The thickness may be, e.g. 5-10 millimeters. In general, the antenna elements 308, 310 may be printed circuit board antennas, ceramic chip or patch antennas connected to the TRX 306 with coaxial cables, for example.

Figure 12A:
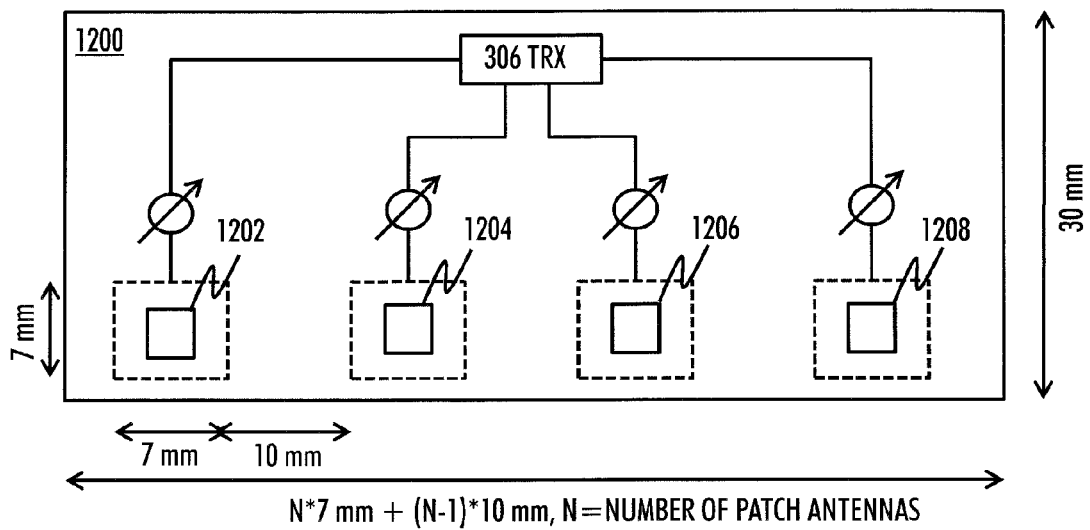
FIGS. 12A and 12B illustrate embodiments of the radio apparatus.
Figure 12B:
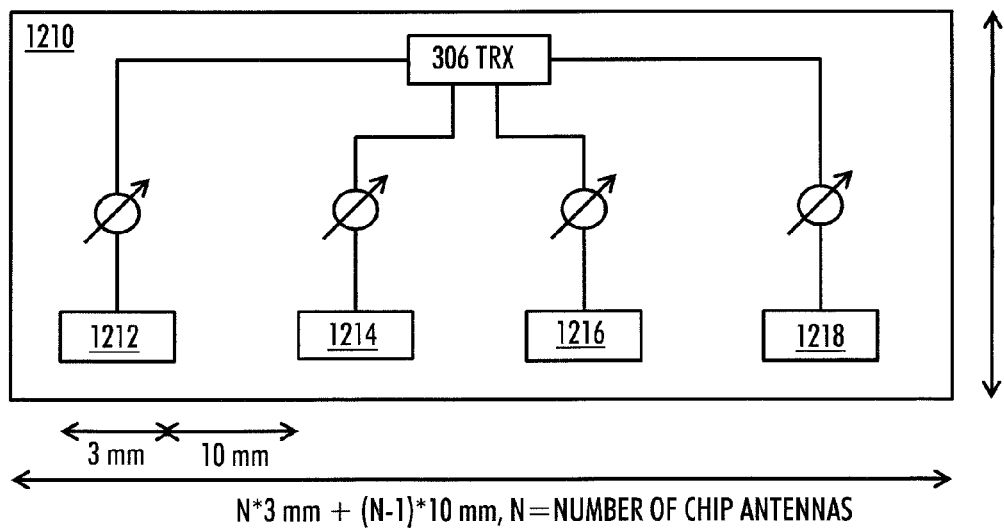

FIGS. 12A and 12B show embodiments for the radio apparatus 300 comprising such dielectric structures. FIG. 12A illustrates the radio apparatus 300 comprising a patch antenna structure 1200 having four ceramic patch antenna elements 1202, 1204, 1206, 1208. Each of them is embedded within a dielectric material, as represented with dotted blocks in FIG. 12A. The dielectric blocks are separated by 10 mm from each other. Each dielectric block has dimensions of 7 mm times 7 mm. Thus, one dimension of the patch antenna structure 1200 is N*7 mm+(N−1)*10 mm, where N is the number of patch antenna elements 1202, 1204, 1206, 1208. According to the proposed radio apparatus 300, N is at least 2, or more.

FIG. 12B illustrates the radio apparatus 300 comprising a patch antenna structure 1210 having four ceramic chip antenna elements 1212, 1214, 1216, 1218. Each of them is embedded within a dielectric material (e.g. ceramic). The dielectric blocks are separated by 10 mm from each other. Each dielectric block has a dimension of 3 mm. Thus, one dimension of the chip antenna structure 1210 is N*3 mm+(N−1)*10 mm, where N is the number of the chip antenna elements 1212, 1214, 1216, 1218. According to the proposed radio apparatus 300, N is at least 2, or more.

Figure 4:
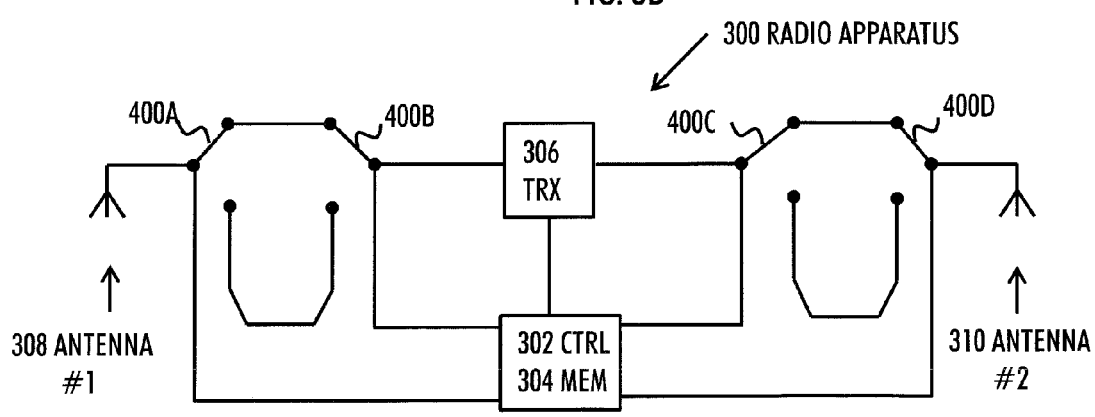

In an embodiment, the direction of the main lobe of the at least one antenna beam pattern is adjustable with the two at least two antenna elements. In an embodiment, as shown in FIG. 4, the radio apparatus 300 further comprises switched delay line phase shifters for adjusting the relative phases of antenna signals. The directivity of the main beam/lobe may be adjusted by applying signals with certain phases to the antennas 308, 310. In FIG. 4, two bit phase shifters are applied with a "single-pole, double-throw" (SPDT) switches 400A to 400D which are changeover switches: one input/output is connected to one of two outputs/inputs, respectively. The control circuitry 302 (CTRL) may operate the switches with signaling commands. Depending on the electrical length of the feed signal to the antenna, the signal arriving at the antenna has a certain phase. By adjusting the electrical length of the route from the TRX 306 to the antennas 308, 310, the phase of the corresponding feed signals may be altered. For example, the phase shift Δϕ may be determined as:

$$\Delta\varphi = \frac{360° \cdot d \cdot \sin\theta}{\lambda} \quad (1)$$

where d is the distance of antennas, θ is the desired beam steering angle and λ is the wavelength depending on the applied frequency. In this way the required phase shift and the required change in the route length of the antenna feed signal may be determined, as known by a skilled person.

Figure 5A:
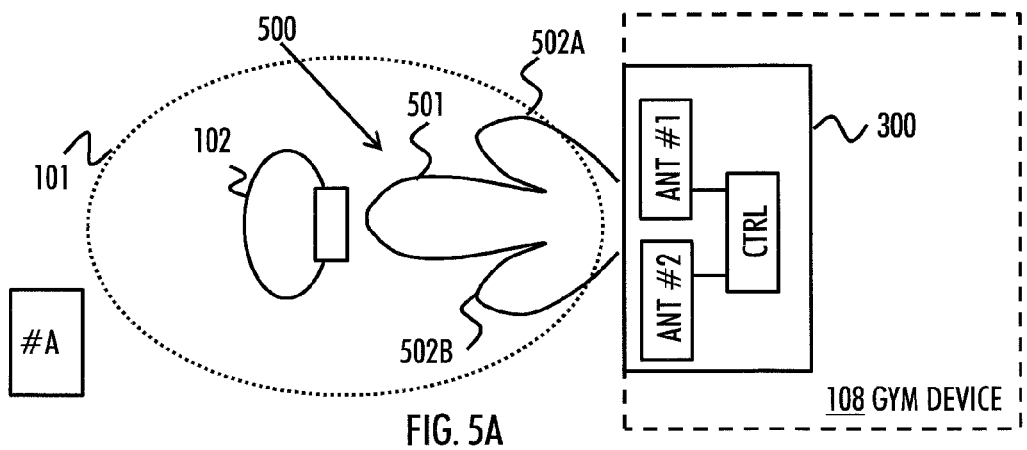
FIGS. 5A and 5B illustrate the definition of an exercise area, according to some embodiments.
Figure 5B:
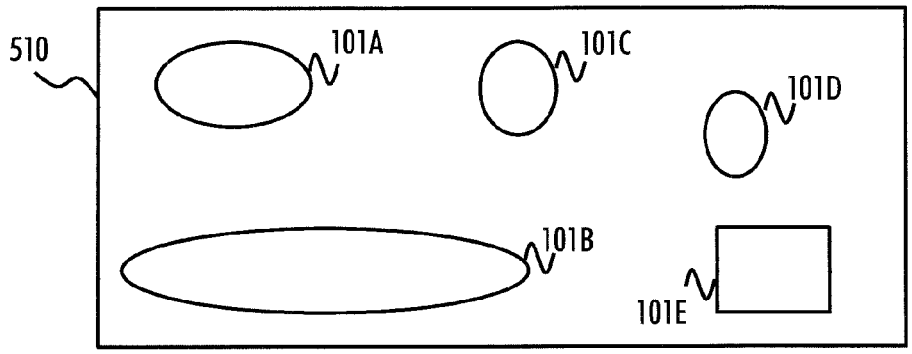

Let us now take a look at FIGS. 5A and 5B. FIG. 5B depicts a gym 510 with several different exercise devices. Each gym device may have a specific exercise area 101A to 101E comprising the area in proximity of the relevant gym device. Such exercise area 101 is typically dedicated to a specific exercise and may involve the use of exercise equipment. The exercise area 101 may be an area dedicated to an individual during the exercise. In this sense, the exercise area 101 may also be called a personal exercise area. FIG. 5A further depicts an example exercise area 101. The exercise area 101 may be defined by the type of exercise to be carried out in the exercise area 101 and/or by the type of the relevant gym device, such as a treadmill, bike, or cross-training equipment. The dimensions of the personal exercise area 101 may be such that the person is expected to stay within the bounds of the personal exercise area 101 during the exercise. The range of the exercise area 101 may be, for example, 1×1 meters or 1×2 meters. For example, in case of a treadmill, the exercise area 101 may correspond to the area above the moving mat in which the user 100 runs. In case of a bicycle, as shown in FIG. 1A, the exercise area 101 may comprise the area above the seat of the bicycle. In case of weight lifting, the exercise area 101 may comprise the area in which the specific weight lifting by the user 100 occurs. It should be noted though that in the case the user performs push-ups, squats, or alike, on a mat or on a floor, the exercise area 101 may be the area in which the exerciser performs the push-ups or alike. In this case, there may not be any specific gym device with which the exercise is performed. However, even in such case there may be a radio apparatus 300 located near that exercise area 101 in order for the radio apparatus 300 to detect the presence of an exerciser. The radio apparatus 300 may then be mounted on a near-by wall or a ceiling, for example. Here the gym device may then be seen as the mounting element of the radio apparatus 300, for example.

Further, as shown in FIG. 5A, in addition to proximity limitations, the exercise area 101 may also have angular limitations so that the exercise area 101 is present only in one predetermined direction from the gym device 108. The predetermined direction may be specified with an angular spread of certain number of degrees. For example, in case of the bicycle, the proximity area in front of the bicycle may not be part of the exercise area 101.

In other words, the exercise area 101 is the area in which the user 100 is expected to be while performing the exercise with the corresponding gym device 108. The exercise area 101 may be empirically derived for each type of gym device.

In an embodiment, the radio apparatus 300 may control the direction of the main lobe 501 of the at least one antenna beam pattern 500 by adjusting the relative phases of antenna signals. As shown in FIG. 5A, the exercise sensor 102 is located in the exercise area 101 while performing exercise with the corresponding gym device 108. Consequently, the antenna main beam(s) 501 may be directed to the exercise area 101 of the gym device 108. This may be beneficial as then the efficiency of the wireless data transfer between the radio apparatus 300 (comprised in the gym device 108) and the exercise sensor 102 worn by the exerciser 100 may be increased. The amount of interference from or to other sensors in the gym/fitness center may also be decreased because at least most of the other radio transceivers (other sensors or other gym devices) are located in different angles than the exercise sensor 102 in the exercise area 101. Naturally, there may be side beams or side lobes 502A, 502B directed outside the desired exercise area 101. The gain of the side lobes 502A, 502B may be small compared to the gain of the desired, main lobe/beam 501 towards the exercise area 101, and thus, towards the exercise sensor 102 during use of the corresponding gym device 108.

Picture the following scenario in a gym: a user equipped with the exercise sensor 102 wishes to exercise with the counterpart apparatus (e.g. the gym device 108), but the counterpart apparatus 108 cannot decide whether it should be paired with the identifier transmitted by the exercise sensor 102 or with another identifier transmitted by another exercise sensor which is located outside the exercise area 101. As may be understood by a skilled person, there may be a vast number of exercisers and exercise sensors in the gym. Each sensor may be transmitting its own signal detectable by the radio apparatus 300 while scanning the gym environment for exercise sensors. Therefore, it may be noted that selecting the correct exercise sensor to pair with may be a cumbersome task. For example, it may be that an exercise sensor #A located, e.g., two meters away from the gym device 108 provides a stronger signal than the exercise sensor 102 located in the exercise area 101 of the gym device 108 and carried by a person 100 using the gym device 108. In such case, selection based only on the signal strength may cause the gym device 108 to erroneously pair with the sensor #A.

In order to solve the above mentioned problem, in an embodiment, the radio apparatus 300 is caused to generate at least two antenna beam patterns by utilizing the at least two antenna elements, wherein the directions of the main lobes of the generated two antenna beam patterns are different. In an embodiment, the radio apparatus 300 may select one of a plurality of exercise sensors to pair with, wherein the selection is made on the basis of radio signal strength measurements performed with the at least two antenna beam patterns.

Figure 6:
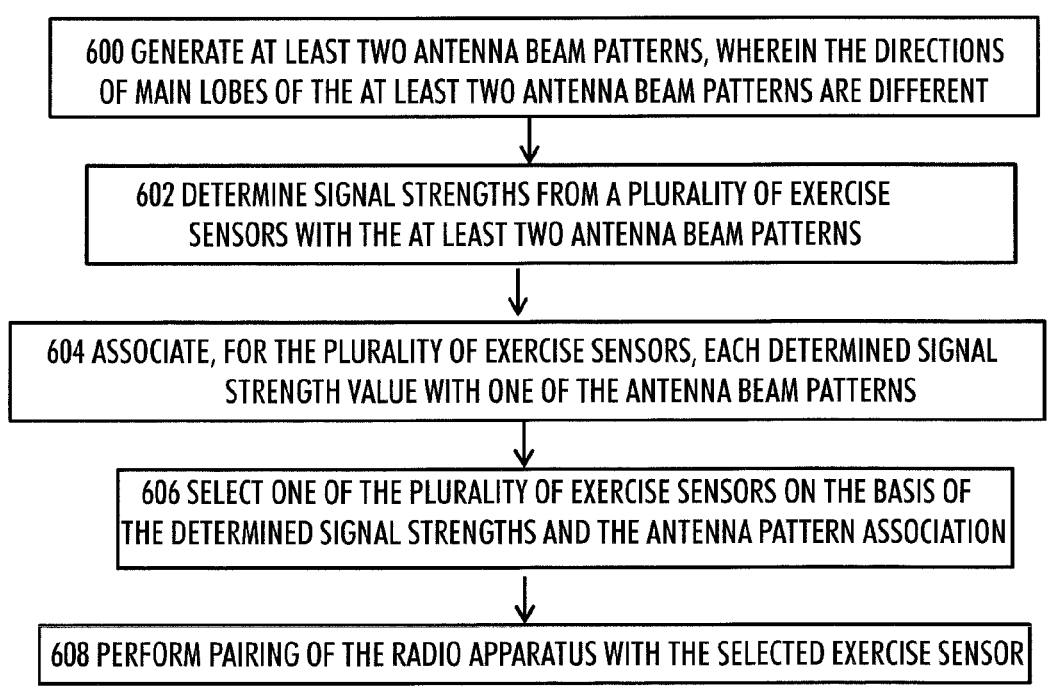
FIG. 6 depicts a pairing process, according to an embodiment.

FIG. 6 describes an embodiment for performing the pairing of the radio apparatus 300 (i.e. the gym device 108) with the exercise sensor 102. The method of FIG. 6 starts in step 600 by the radio apparatus 600 generating at least two antenna beam patterns, such as the beam patterns 700 and 702 of FIG. 7A. The main lobes 706 and 708 of the respective antenna beam patterns 700, 702 are directed in different directions. In one embodiment, one beam is directed to the exercise area 101 corresponding to the gym device 108 in question. In an embodiment, the at least two antenna beam patterns 700, 702 are generated in turns adjacent to each other. In this case, it may be said that the generated antenna beam patterns sweep through the predetermined directions in time domain. The sweep can be continuous or discrete in the angle domain. In another embodiment, the main lobes 706, 708 of the respective antenna beam patterns 700, 702 are generated simultaneously to different directions.

In an embodiment, each pattern 700, 702 is generated with the at least two antenna elements 308, 310. Such use of multiple antenna elements (e.g. the use of antenna array 309) may enable adjusting the direction of the antenna pattern, as has been described. In another embodiment, each antenna pattern is generated with one antenna element. In such case the different directions of the antenna beam patterns (radiated from the different antennas) is acquired by physically directing the antenna elements in different directions.

It is further proposed that, in step 602, the radio apparatus 300 determines the signal strengths from the plurality of exercise sensors, such as sensors A, B and C of FIG. 7A with the at least two antenna beam patterns 700, 702. The signal strength may be represent as the received signal strength indicator (RSSI) value. By performing such detection of the RSSI with more than one beam pattern, the location of the exerciser carrying the exercise sensor may be more accurately determined. For example, the location of the exercise sensor in angular domain may be more accurately determined.

This may enable the radio apparatus 300 to associate, for each of the plurality of exercise sensors A, B and C, each determined signal strength value with one of the antenna beam patterns 700, 702 in step 604. Such association may be seen in the table presented in FIG. 7B. In this table it is assumed that there are three beam patterns generated (as shown in FIG. 7A). The table lists the RSSIs from three different exercise sensors A, B, C for each of the beam patterns 1, 2 and 3.

In step 606, the radio apparatus 300 may then select one of the plurality of exercise sensors (A, B and C) on the basis of the determined signal strengths and the antenna pattern association. In step 608, the radio apparatus 300 may perform pairing with the selected exercise sensor 102. The pairing is performed automatically without user-dependent operations. This may be advantageous so that the user carrying the exercise sensor 102 need not manually perform any actions related to the pairing process.

In general, regarding pairing of two devices, such as two Bluetooth devices (e.g. the radio apparatus 300 coupled to the gym device 108 and the exercise sensor 102 carried by the person 100), the information transferred between the devices may be any data that the exercise sensor 102 and the radio apparatus 300 need to identify each other and to communicate with each other. The information may include, e.g., a code identifying the exercise sensor 102, the radio apparatus 300, and/or one of the exercise areas 101A to 101D. The identifier may be a medium access control (MAC), or a part of a medium access control address. Bluetooth utilizes such MAC addresses, for example. For example, the exercise sensor 102 may transmit the identifier of the sensor 102 to the radio apparatus 300 and the radio apparatus 300 may transmit the identifier of the radio apparatus 300 or the gym device 108 to the exercise sensor 102. A further requirement may be that the two devices perform proximity communication with each other. The term "proximity communication" may refer to a communication technology that takes place over relatively small distances. The range of the proximity connection may be such that the user is not required to approach any specific apparatus in order to connect. A suitable range may vary from 0.5 to 1.5 meters. After such process is successfully done between the two devices, the devices may be called as paired devices and may transfer data between each other wirelessly.

Let us look at closer on how the beamforming, use of the plurality of antenna beam patterns 700, 702, 704 and the pattern association may be performed in one embodiment by looking at the FIGS. 7A and 7B closer. The three exercise sensors A, B, C may be moving inside the gym: the persons carrying them may move to another training session with another gym device, for example. In an embodiment, the radio apparatus 300 may direct the main lobe 706 of a first antenna beam pattern 700 to the exercise area 101 of the gym device 108 to which the radio apparatus 300 is coupled or integrated to. Further, the radio apparatus 300 may direct the main lobe 708 of a second antenna beam pattern 702 at least partially outside the exercise area 101 of the gym device 108. Further, in the example case, there is yet one antenna beam pattern 704 generated and the main lobe 710 is directed at least partially outside the exercise area 101 of the gym device 108. The main lobe 710 is on the other side of the exercise area 101 than the main lobe beam 708: the main lobe 708 on the right side of the exercise area 101 and the main lobe 710 is on the left side of the exercise area 101, when looking from the above. The at least two antennas 308, 310 may allow to conduct selective spatial sampling of radio signals. Let us in the following consider the antenna beam pattern 700 as the beam #1, the antenna beam pattern 702 as the beam #2 and the antenna beam pattern 704 as the beam #3.

Then the radio apparatus 300 may determine, for each of the plurality of exercise sensors A, B, C, which antenna beam (#1, #2, or #3) provides the strongest signal strength. That is, to determine the signal strength in the antenna beam #1 and at least in the antenna beam #2. In this example case, also the received signal strength in the antenna beam #3 is measured. As shown in the table of FIG. 7B, the strongest signal from the sensor A is associated with the beam #1, the strongest signal from the sensor B is associated with the first beam #1, and the strongest signal from the sensor C is associated with the beam #2. It may be seen that sensor C has a strongest signal strength associated with the beam #2 which is not directed to the exercise area 101. The beam #1 provides a weaker RSSI for the sensor C than the beam #2. From this it may be determined that the sensor C is not in the direction of the exercise area 101 of the gym device 108. The two other sensors A and B are in the direction of the exercise area 101 because their strongest RSSI is associated with the beam #1 directed to the exercise area 101. As a result, it may be determined that the sensor C is not the one to pair with even though it provides the strongest signal among all the exercise sensors A, B and C. The reason for providing the strongest RSSI may be that the sensor C is transmitting its signal with the highest transmit power, for example, or that it is nearest to the gym device 108 but on the side of the gym device 108 and, thus, not using the gym device 108. Consequently, it may be derived that the pairing should be done with either of the sensors A and B.

Therefore, the radio apparatus 300 may disregard those exercise sensors, such as the sensor C, which do not have their strongest signal strength associated with the antenna beam #1 directed to the exercise area 101. Further, the radio apparatus 300 may then determine which one of the remaining sensors A and B has the strongest signal strength associated with the first antenna beam #1, i.e., which of the sensors A and B provides the strongest signal from the direction of the exercise area 101. In this example case, the sensor B provides an RSSI of 6 for the beam #1 whereas the sensor A provides an RSSI of 2 for the beam #1. From this it may be determined that the sensor B may be closer to the radio apparatus 300. Then the radio apparatus 300 may select, among the rest of the exercise sensors A and B, the one (B) with the strongest signal strength associated with the antenna beam #1. Consequently, the radio apparatus 300 may in step 608 perform pairing with this sensor B as it is, with a high probability, carried by a user performing exercise with this gym device 108.

FIGS. 13A and 13B describe yet one embodiment for performing the pairing of the radio apparatus 300 (i.e. the gym device 108) with an exercise sensor. In this embodiment, the radio apparatus 300 is caused to, in step 1310, generate a first antenna beam pattern 1302 with at least a first antenna element (e.g. element 308) of the at least two antenna elements 308, 310. The first antenna beam pattern 1302 is arranged to be directed to the exercise area 101 of the gym device 108, as shown in FIG. 13A. In step 1312, the radio apparatus 300 determines signal strengths of a plurality of exercise sensors A, B, C with the first antenna beam pattern 1302.

In step 1314, the radio apparatus 300 generates a second antenna beam pattern 1304 with at least a second antenna element (e.g. the antenna) element 310) of the at least two antenna elements 308, 310. The second antenna beam pattern 1304 is arranged to be directed to the exercise area 101 of the gym device 108. Then in step 1316, the radio apparatus 300 determines signal strengths of the plurality of exercise sensors A, B, C with the second antenna beam pattern 1304.

The second antenna element may be spatially separated from the first antenna element such that the respective antenna beam patterns 1302, 1304 have main lobes directed to different directions, although both pointing towards the exercise area 101. In an embodiment, the separation between the first and second antenna elements radiating the respective first and second antenna beam patterns is between 50 and 80 cm. In an embodiment, the radio apparatus 300 may include means for providing enough separation between the first and second antenna elements. Example means may comprise coaxial cables between the TRX 306 and the first and/or second antenna elements, supporting structure for supporting the first and second antenna elements.

In practice, the radio apparatus may determine which beam 1302, 1304 to generate or dynamically switch between the beams 1302, 1304 with a switching structure 1300, as shown. The corresponding RSSI values may then be recorded for each beam 1302, 1304.

Then the apparatus 300 may select, in step 1318, one of the plurality of exercise sensors A, B, C on the basis of the determined signal strengths. For example, in the example case of FIG. 13A, the selection may most likely be with the exercise sensor B, as it is likely that it will provide the strongest signal strength. Finally, pairing of the radio apparatus 300 with the selected exercise sensor B may be performed in step 1320. Such measurement of signal strengths from different spatial angles may be beneficial in more reliably determining which exercise sensor is located in the desired area, i.e. in the exercise area 101 of the relevant gym device 108.

In an embodiment, the radio apparatus 300 may determine a combined signal strength for each exercise sensor A, B, C. An example of the combined signal strength may be an arithmetically combined signal strength for each exercise sensor A, B, C. Such arithmetically combined signal strength may be an average signal strength, for example. The averaging may be made between the signal strength associated with the beam 1302 and the signal strength associated with the beam 1304. In the case of averaging, the radio apparatus 300 may select the exercise sensor which provides the highest average signal strength and pair with the selected exercise sensor in order to transfer exercise data with that exercise sensor.

It should be noted that there may be more than two beams 1302 and 1304 generated if more data is needed for the averaging. In such case, there may be more than two antenna elements in the radio apparatus 300. Further, each antenna beam pattern may be generated by a separate antenna array comprising more than one antenna element. In such case, the antenna element need not be physically directed towards the exercise sensor 101 (as is the case in the example of FIG. 13B), but each antenna array may apply phasing of the feed signals to adjust the direction of main lobes of the generated antenna beam patterns. In this case the at least two antenna arrays are separated from each other by 50-80 cm.

In an embodiment, if none of the exercise sensors provide an RSSI high enough, e.g. above a certain pairing threshold, the radio apparatus 300 may decide not to perform any pairing. In an embodiment, the radio apparatus 300 may constantly or according to some intervals perform the process depicted in FIG. 6 or in FIG. 13B in order to determine whether an exerciser carrying an exercise sensor is in the exercise area 101 of the relevant gym device.

In an embodiment, the gym device 108 is equipped with a sensor which detects if someone starts using the gym device 108. Further, upon detecting that the gym device 108 is being used or that someone starts using the gym device 108, the radio apparatus may be triggered to perform the process of FIG. 6 or FIG. 13B in order to perform pairing with the exercise sensor in the exercise area 101.

FIG. 8 provides an embodiment for narrowing down the possible candidate exercise sensors to pair with. For this embodiment, let us consider that the said plurality of exercise sensors mentioned in FIGS. 6, 7 and 13 form a first set of exercise sensors. E.g. the radio apparatus 300 may perform in step 602 the determination of signal strengths from the first set of exercise sensors with each of the at least two antenna beam patterns. The first set comprises one or many exercise sensors detected by the radio apparatus 300 while scanning the radio environment of the gym.

The embodiment of FIG. 8 may be performed before the step 602 or the step 1312, for example. The embodiment may comprise determining signal strengths from a second set of exercise sensors with a predetermined antenna beam pattern in step 800. The second set of sensors may be larger than the first set. The second set may comprise, e.g. each detected exercise sensor in the gym. The predetermined antenna beam pattern may be, for example, one of the three antenna beam patterns of FIG. 7A, such as the beam pattern 700. As proposed, the radio apparatus 300 may thus determine the RSSIs from each of the second set of a plurality of exercise sensors with only the beam pattern 700. Imagine this is performed in the example of FIGS. 7A and 7B. Then the acquired RSSIs for sensors A, B and C are 2, 6 and 7, respectively. As a result, the radio apparatus 300 may sort the detected exercise sensors on the basis of the measured RSSIs.

In step 802, the radio apparatus 300 may disregard those exercise sensors of the second set which provide a signal strength value below a predetermined threshold with the predetermined antenna beam pattern. For example, it may be empirically derived that when the RSSI is below e.g. four, the sensor is most likely far from the relevant gym device. That is, the sensor is most likely not in the exercise area 101 of the relevant gym device and pairing should not be done with that exercise sensor. In the example case of FIG. 7, the sensor A is disregarded from the second set as its RSSI is below four.

In step 804, the radio apparatus 300 may consider the remaining exercise sensors (i.e. the sensors B and C) of the second set as the first set of exercise sensors. In this way a smaller, first set of exercise sensors may be acquired which may not comprise all the scanned sensors in the gym. Consequently, e.g. in step 602, the radio apparatus need not concern about the sensor A, but determine the RSSIs with the beams #2 and #3 only for the sensors B and C. This may be advantageous because then the determination of the RSSI with each antenna beam pattern need not be performed for all the detected exercise sensors but only to a smaller set of exercise sensors. This may save time and computational resources.

Looking at FIG. 5A, once the pairing is done, the radio apparatus 300 may communicate exercise data with the paired exercise sensor 102 located in the exercise area 101 of the corresponding gym device, wherein the main lobe 501 of the at least one antenna beam pattern 500 is directed to the exercise area 101. In this way the data transfer efficiency may be increased and interference to/from other radio receivers and/or transmitters may be decreased. This may increase the reliability of the established connection.

In an embodiment, the communicated exercise data comprises at least one of the following: heart rate zones, heart activity samples, heart rate variation samples, fat consumption, calorie consumption, activity samples, speed and/or pace samples, power samples, cadence samples, temperature samples, pedal index, left-right balance, running index, training load, galvanic skin response samples, fluid balance, blood pressure samples, skin temperature samples, music samples, status of the battery of the exercise sensor, equipment identification information, registration information, user attributes such as name, gender, age, weight, height, fitness level, training history comprising measurement data and accumulated performance data, training schedule, maximum oxygen intake (VO2Max), maximum heart rate (HRMax), performance zones (heart rate zones, speed zones), aerobic and anaerobic thresholds, etc. In one embodiment, the transferred data may indicate the types of data the interface unit 106 of the gym device 108 is to display or otherwise output.

Figure 9A:
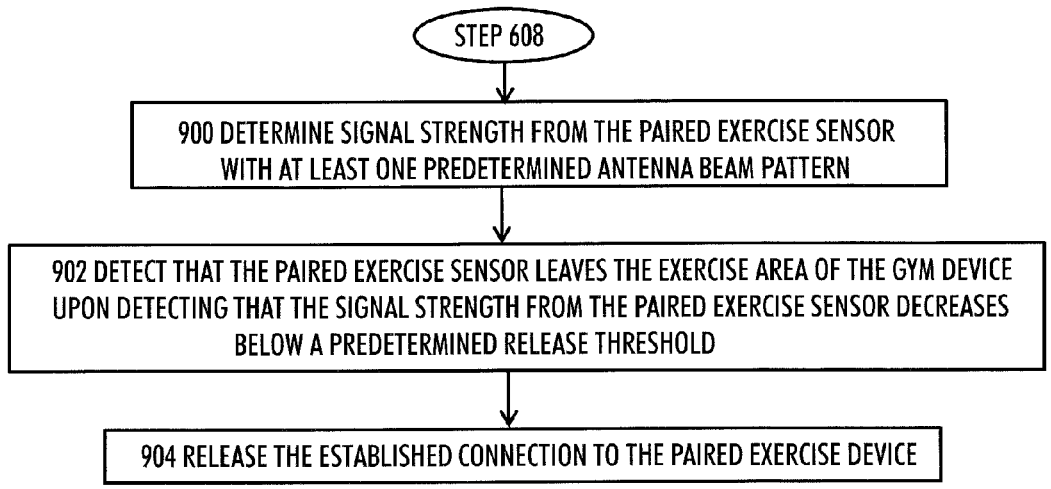

FIG. 9A shows an embodiment for releasing the established connection to the paired exercise device. In this embodiment, the radio apparatus 300 determines, in step 900, signal strength of the paired exercise sensor. As explained earlier, the paired exercise device is the one with which the gym device 108 has exchanged the identity information and with which the gym device 108 transfers exercise related data. The strength determination may be done by applying one or more predetermined antenna beam patterns. Then, in step 902, the radio apparatus 300 may determine that the paired exercise sensor leaves the exercise area 101 of the gym device 108 upon detecting that the signal strength of the paired exercise sensor decreases below a predetermined release threshold. Each predetermined antenna beam pattern may have its own empirically derived release threshold. For example, when the person carrying the paired exercise sensor stops the training and moves away from the exercise area 101, the signal strength most likely decreases below the release threshold.

In an embodiment, the release threshold is adjustable so that the release threshold may be automatically set to correspond to the level of the signal strength detected when the user is in the exercise area 101. In other words, after the pairing is performed, it is likely that the exerciser is performing the exercise with the gym device 108 corresponding to the exercise area 101. The radio apparatus 300 may then consider the detected signal strength during the exercise as the release threshold.

Finally, in step 904, the radio apparatus 300 may release the established connection to the paired exercise device.

Figure 9B:
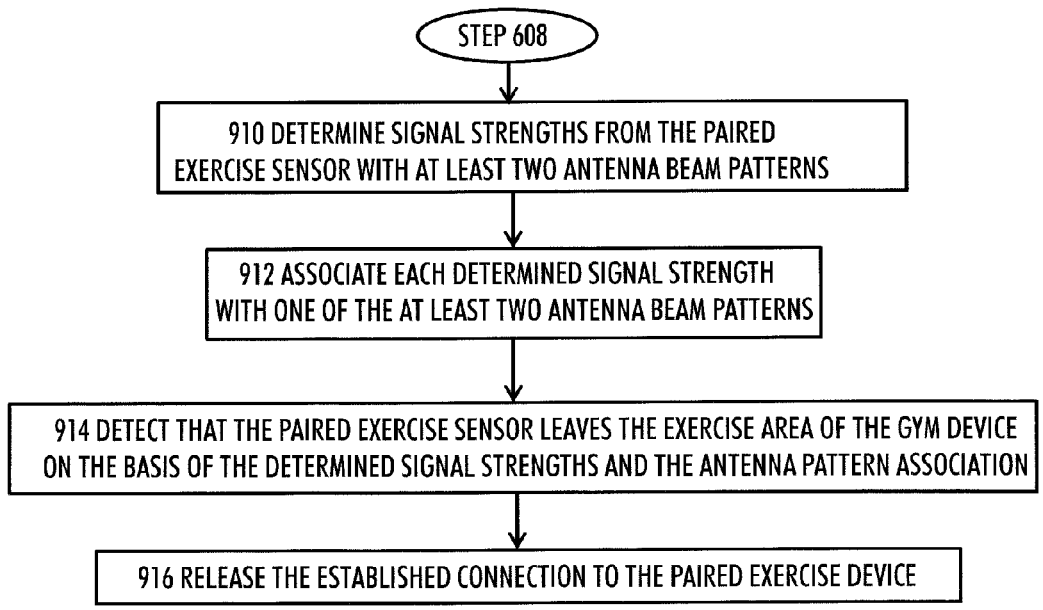

FIG. 9B shows another embodiment for releasing the established connection to the paired exercise device. In this embodiment, the radio apparatus 300 determines, in step 910, signal strengths from the paired exercise sensor with at least two antenna beam patterns and associates, in step 912, each determined signal strength with one of the antenna beam patterns. In step 914, the radio apparatus may determine that the paired exercise sensor leaves the exercise area 101 of the gym device 108 on the basis of the determined signal strengths and the antenna pattern association. For example, when it is detected that another antenna beam pattern than the first antenna beam pattern (directed to the exercise area 101) provides the strongest RSSI, it may be determined that the paired exercise sensor has moved away from the gym device 108. Consequently, in step 916, the radio apparatus 300 may release the established connection to the paired exercise device.

In an embodiment, the gym device 108 is equipped with a sensor which detects if someone stops using the gym device 108. Further, upon detecting that the gym device 108 is no longer used, the radio apparatus may be triggered to perform the process of FIG. 9A or 9B in order to release the connection to the paired exercise sensor.

Figure 10:
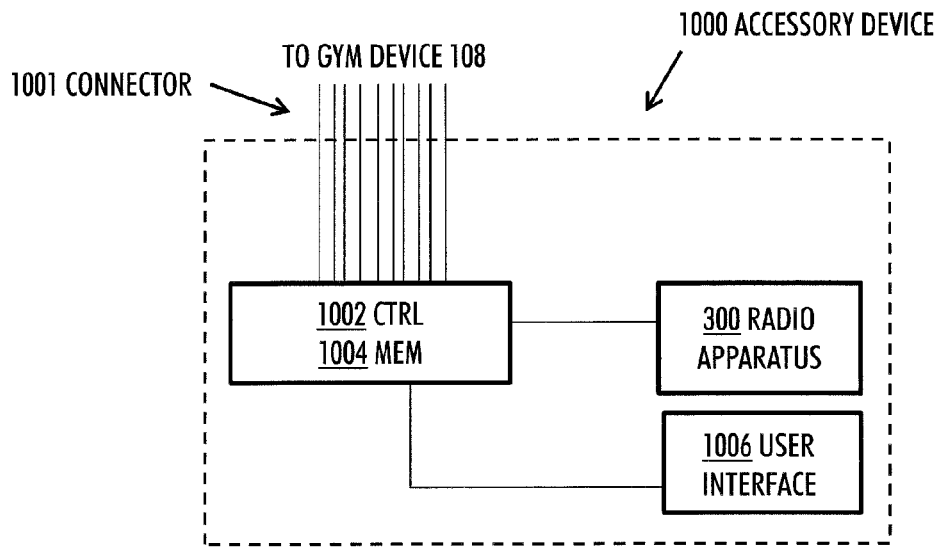
FIGS. 10 and 11 illustrate an accessory device and an interface unit of the gym device, respectively, according to some embodiments.

In an embodiment, the radio apparatus 300 is integrated into an accessory device which is releasably attachable to the gym device 108. FIG. 10 shows an example accessory device 1000 which may comprise the radio apparatus 300 and which may be releasably connected to the gym device 108. By releasable attachment it is meant that any person may attach the accessory device 1000 detachably and/or remove the accessory device 1000 from the gym device 108. The gym device 108 may comprise a mounting location or a docking station, such as a socket or a recession, to receive and support the accessory device 1000 during the physical exercise. Such docking station may comprise an electric connector for connecting electronic circuitries of the gym device 108 to the accessory device 1000. In an embodiment, the accessory device 1000 is the tablet computer, palm computer, or mobile phone. In general, the accessory device 1000 may be a device which may be purchased by a private user as a stand-alone device.

In an embodiment, the accessory device 1000 is a portable electronic device connected to the gym device 108 through a standardized connector 1001, e.g. universal serial bus (USB), Firewire, Ethernet, high-definition multimedia interface (HDMI), RS-232, RS-485, I2C. In an embodiment, the standardized connector 1001 provides for a bidirectional communication between the accessory device 1000 and the gym device 108. The physical form of the electric connector 1001 may be a mini USB connector or any other dock connector that is commonly used as a data connector to connect an appliance to a tablet computer, a palm computer, or a mobile phone. In yet one embodiment, the accessory device 1000 and the gym device 108 may communicate wirelessly via the Bluetooth or a WLAN, for example. The use of the standardized connection enables connection of commercially available portable electronic devices such as a tablet computer or a mobile phone to the gym device 108. Accordingly, the user may have readily available any training program and personal parameters for the physical exercise, and the user may easily bring the accessory device 1000 from one gym device to another.

Figure 11:
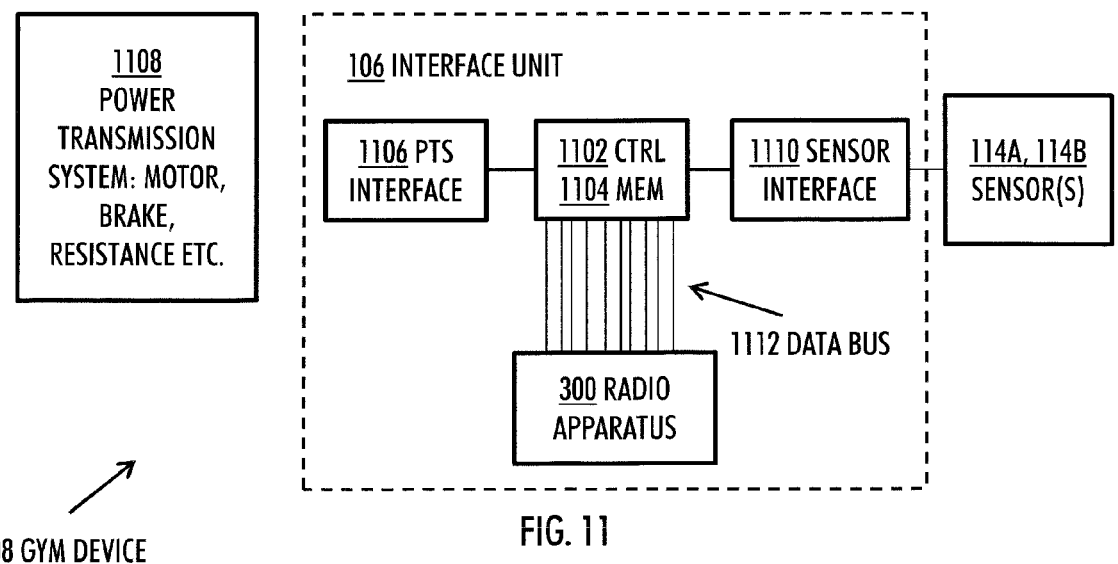

The accessory device 1000 may further comprise at least one processor 1002 and at least one memory 1004 including a computer program code configuring the operation of the accessory device 1000. In an embodiment, the accessory device 1000 comprises a user interface 1006, such as buttons for controlling the accessory device 1000. There may also be a display in the user interface 1006 for displaying at least some information, such as heart activity information, to the user. In one embodiment, the display operates as a touch display through which the user may give commands. Wireless connection to the exercise sensor 102 may be acquired by the radio apparatus 300, as explained. The exercise data acquired from the exerciser may be received directly from the exercise sensor 102 worn by a person 100 exercising with the gym device 108. In another embodiment, the exercise data is acquired from the gym device 108 via the connecter 1001. This may be the case when the gym device 108 is equipped with sensor areas 114A, 114B, as shown in FIGS. 1B and 11. The sensor areas 114A, 114B may be for detecting the heart activity of the exerciser while the exerciser 100 holds his/her hands on the areas 114A, 114B.

In another embodiment, the radio apparatus 300 may be an integrated part of the gym device 108. That is, there may be provided a gym device 108 comprising the radio apparatus 300, as shown in FIG. 11. The radio apparatus 300 may be fixed to the gym device 108 during its manufacturing phase such that the removal or replacement of the radio apparatus 300 requires tools and a maintenance expert. The radio apparatus 300 may be electromechanically connected to the gym device 108. The radio apparatus 300 may be part of the interface unit 106 of the gym device 108, as shown in FIG. 11.

In an embodiment, the interface unit 106 further comprises at least one processor 1102 and at least one memory 1104 including a computer program code configuring the operation of the interface unit 1100, such as signal routing, data format conversions. FIG. 11 further illustrates components of the gym device 108, e.g. a power transmission system 1108 and optional sensors 114A, 114B. The interface unit 106 comprises a power transmission system (PTS) interface 1106 to the power transmission system 1108 of the gym device 108. The power transmission system 1108 may comprise any components that relate to the mechanics of the gym device 108. The power transmission system 1108 may comprise a motor, brakes, resistance, components affecting physical resistance to the power input applied by the user 100, gears, etc. In an embodiment, the interface unit 106 further comprises a sensor interface 1110 connecting to one or more sensors 114A, 114B comprised in the gym device 108.

Further, in the embodiment of FIG. 11, the radio apparatus 300 may comprise a data bus 1112 connectable to a data bus of the gym device 108. Then the radio apparatus 300 may communicate exercise data with the gym device 108 via the data buses. The data bus 1112 and the radio apparatus 300 may be inside the gym device 108, for example. The data bus 1112 may be connected to the data bus coupled to the controller circuit 1102 of the gym device 108. Such application of data bus 1112 may provide ease of manufacturing of the radio apparatus 300. An OEM (original equipment manufacturer) PCBs comprising the radio apparatus 300 with the data bus 1112 may be sold to the manufacturers of the gym devices who may install the radio apparatus 300 to the gym device, or to other exercise equipment, at their factories.

In the embodiment of FIG. 10, a data bus of the radio apparatus 300 may be connectable to a data bus of the accessory device 1000. In this case, the data bus may be connected to the data bus coupled to the controller circuit 1002 of the accessory device 1000, which may then be coupled to the gym device 108 with the connector 1001, for example. Again, the manufacturers of the accessory devices 1000 may find it useful to purchase radio apparatuses 300 having the data bus which may be directly coupled to and placed inside the accessory device 1000 at the factory.

In an embodiment, the radio apparatus 300 is used in obtaining location data from a certain exercise sensor. Imagine, for example, a football game where each player of a team carries a heart activity sensor. After pairing with the sensor carried by a selected player, the location of the paired player in the field may be known by actively sweeping the antenna beams throughout the field. In this case, the meters run in the field by the selected player may be established when the grid of antenna beams is narrow enough to differentiate even small movements of the player. In this embodiment, the field may be considered to represent the exercise area 101.

In one embodiment, in addition to displaying or otherwise outputting the received measurement data, the interface unit 106 may be configured to stream the exercise data received from the paired exercise sensor to a server computer 104 over a network, as shown in FIG. 1A. In some cases, the interface unit 106 cannot establish a direct circuit connection with the server computer 104 so the connection may be routed through one or more communication networks. At least some of the networks may be public networks, e.g. the Internet. As a consequence, the interface unit 106 may be considered as a network node configured to stream the measurement data to the server computer 104 during the physical exercise. For the streaming, the interface unit 106 of the gym device 108 and the server computer 104 may apply a standardized or otherwise predetermined communication protocol. This may aid in identifying the transferred data by the server computer 104 when receiving the data. For example, a certain type of data, such as blood pressure data, may be transmitted in a certain frame of the transmitted message to the server computer 104.

In an embodiment, the interface unit 106 receives the exercise data, such as the heart activity measurement data, decodes the received heart activity measurement data, and prepares a message comprising the heart activity measurement data and the sensor identifier of the measurement sensor 102. Then, the interface unit 106 may transmit the heart activity measurement data and the sensor identifier of the measurement sensor 102 to the server computer 104 over the network connection. In another embodiment, the sensor identifier may be provided to the server computer 104 during the establishment of the network connection between the interface unit 106 and the server computer 104. Upon receiving the heart activity measurement data together with the sensor identifier of the measurement sensor 102, the server computer 104 may determine a user account to which store the received heart activity measurement data on the basis of the sensor identifier. As the sensor identifier has already been associated with a specific user account, the server computer 104 may use the sensor identifier as the link between the user account and the heart activity measurement data. Thus, the server computer 104 searches for a user account having the same sensor identifier as the sensor identifier associated with the heart activity measurement data received. Upon discovering the appropriate user account, the server computer 104 stores the received heart activity measurement data to the correct user account.

The above-described embodiment solves a problem of enabling the interface unit 106 to determine a correct server storing the user account of the user 100. It also solves a problem of enabling the server to store the heart activity measurement received from the interface unit 106 into a correct user account. It should be noted that the interface unit 106 may be used by different users at different times.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A gym device, comprising:
a radio apparatus, the radio apparatus comprising:
a phased antenna array comprising at least two phased antenna elements for wirelessly communicating heart activity data with exercise sensors;
at least one processor; and
at least one memory including a computer program code, wherein the at least one memory and the computer program code are configured, with the at least one processor, to cause the radio apparatus to perform operations comprising:
generating at least one antenna beam pattern with the at least two phased antenna elements, wherein at least one main lobe of the at least one antenna beam pattern is directed towards a gym device-specific exercise area, wherein the gym device-specific exercise area is an area in which the exerciser is located while exercising with the gym device;

performing automatic pairing of the radio apparatus with an exercise sensor located in the gym device-specific exercise area, wherein the automatic pairing comprises:
  identifying that the device to be paired with, among a plurality of different devices in a gym, is an exercise sensor, wherein the identification is based on an identifier received from the exercise sensor; and
  selecting the exercise sensor to be paired with from a plurality of exercise sensors in a gym on the basis of received signals strengths from the plurality of exercise sensors and by applying the at least two phased antenna elements in order to determine which exercise sensor among the plurality of exercise sensors is located in the gym device-specific exercise area; wherein the radio apparatus is further caused to perform operations comprising:
communicating heart activity data wirelessly with the paired exercise sensor by applying the at least one antenna beam pattern and a short-range device-to-device technology, wherein the radio apparatus further comprises a wired data bus; and
communicating the heart activity data with the gym device over the wired data bus.

2. The gym device of claim 1, wherein the at least one memory and the computer program code are configured, with the at least one processor, to cause the radio apparatus further to perform operations comprising:
  generating at least two antenna beam patterns, wherein the directions of main lobes of the at least two antenna beam patterns are different;
  determining signal strengths from a plurality of exercise sensors with the at least two antenna beam patterns;
  associating, for the plurality of exercise sensors, each determined signal strength with one of the antenna beam patterns;
  selecting one of the plurality of exercise sensors on the basis of the determined signal strengths and the antenna pattern association; and
  performing pairing of the radio apparatus with the selected exercise sensor.

3. The gym device of claim 2, wherein the at least one memory and the computer program code are configured, with the at least one processor, to cause the radio apparatus further to perform operations comprising:
  directing the main lobe of a first antenna beam pattern to an exercise area of the gym device;
  directing the main lobe of a second antenna beam pattern at least partially outside the exercise area of the gym device;
  determining, for each of the plurality of exercise sensors, signal strength associated with the first antenna beam pattern and signal strength associated with the second antenna beam pattern;
  disregarding those exercise sensors which do not have the strongest signal strength associated with the first antenna beam pattern; and
  selecting, among the rest of the exercise sensors, the one with the strongest signal strength associated with the first antenna beam pattern.

4. The gym device of claim 1, wherein the at least one memory and the computer program code are configured, with the at least one processor, to cause the radio apparatus further to perform operations comprising:
  generating a first antenna beam pattern with at least a first antenna element, wherein the main lobe of the first antenna beam pattern is arranged to be directed to an exercise area of the gym device;
  determining signal strengths from a plurality of exercise sensors with the first antenna beam pattern;
  generating a second antenna beam pattern with a at least a second antenna element wherein the main lobe of the second antenna beam pattern is arranged to be directed to the exercise area of the gym device;
  determining signal strengths from the plurality of exercise sensors with the second antenna beam pattern;
  selecting one of the plurality of exercise sensors on the basis of the determined signal strengths; and
  performing pairing of the radio apparatus with the selected exercise sensor.

5. The gym device of claim 2, wherein the said plurality of exercise sensors forms a first set of exercise sensors, and at least one memory and the computer program code are configured, with the at least one processor, to cause the radio apparatus further to perform operations comprising:
  determining signal strengths from a second set of exercise sensors with a predetermined antenna beam pattern;
  disregarding those exercise sensors of the second set which provide signal strength below a predetermined threshold with the predetermined antenna beam pattern; and
  considering the remaining exercise sensors of the second set as the first set of exercise sensors.

6. The gym device of claim 2, wherein the at least one memory and the computer program code are configured, with the at least one processor, to cause the radio apparatus further to perform operations comprising:
  performing signal strength of a paired exercise sensor with at least one predetermined antenna beam pattern;
  determining that the paired exercise sensor leaves the exercise area of the gym device upon detecting that the signal strength from the paired exercise sensor decreases below a predetermined release threshold; and
  releasing the established connection to the paired exercise device.

7. The gym device of claim 2, wherein the at least one memory and the computer program code are configured, with the at least one processor, to cause the radio apparatus further to perform operations comprising:
  determining signal strengths of a paired exercise sensor with the at least two antenna beam patterns;
  associating each determined signal strength with one of the antenna beam patterns;
  determining that the paired exercise sensor leaves the exercise area of the gym device on the basis of the determined signal strengths and the antenna pattern association; and
  releasing the established connection to the paired exercise device.

8. The gym device of claim 1, the apparatus further comprising:
  the data bus of the radio apparatus connectable to a second data bus, wherein the at least one memory and the computer program code are configured, with the at least one processor, to cause the radio apparatus further to perform operations comprising:
  communicating the exercise data with the gym device via the data buses.

9. The gym device of claim 1, wherein the direction of the main lobe of the at least one antenna beam pattern is adjustable with the two at least two antenna elements.

10. The gym device of claim 9, wherein the at least one memory and the computer program code are configured, with the at least one processor, to cause the radio apparatus further to perform operations comprising:

controlling the direction of the main lobe of the at least one antenna beam pattern by adjusting the relative phases of antenna signals.

11. The gym device of claim 10, wherein the apparatus further comprises:
switched delay line phase shifters for adjusting the relative phases of antenna signals.

12. The gym device of claim 1, wherein the dimensions of the radio apparatus are at maximum 50 millimeters in one side and 30 millimeters in the other side.

13. The gym device of claim 1, wherein the radio apparatus comprises a dielectric substrate structure arranged to reduce the effective wavelength of radio frequency signals in the antenna array.

14. The gym device of claim 1, wherein the radio apparatus is integrated into the gym device.

15. The gym device of claim 1, wherein the radio apparatus is integrated to an accessory device which is releasably attachable to the gym device.

16. The gym device according to claim 1, wherein the short-range device-to-device technology comprises at least one of: Bluetooth, Bluetooth Low Energy, wireless local area network, Area Networking Technology or Area Networking Technology+, or IEEE 802.15.4.

* * * * *